Oct. 30, 1928.
H. WATSON
1,689,266
PROJECTION APPARATUS AND METHOD
Filed Nov. 20, 1922
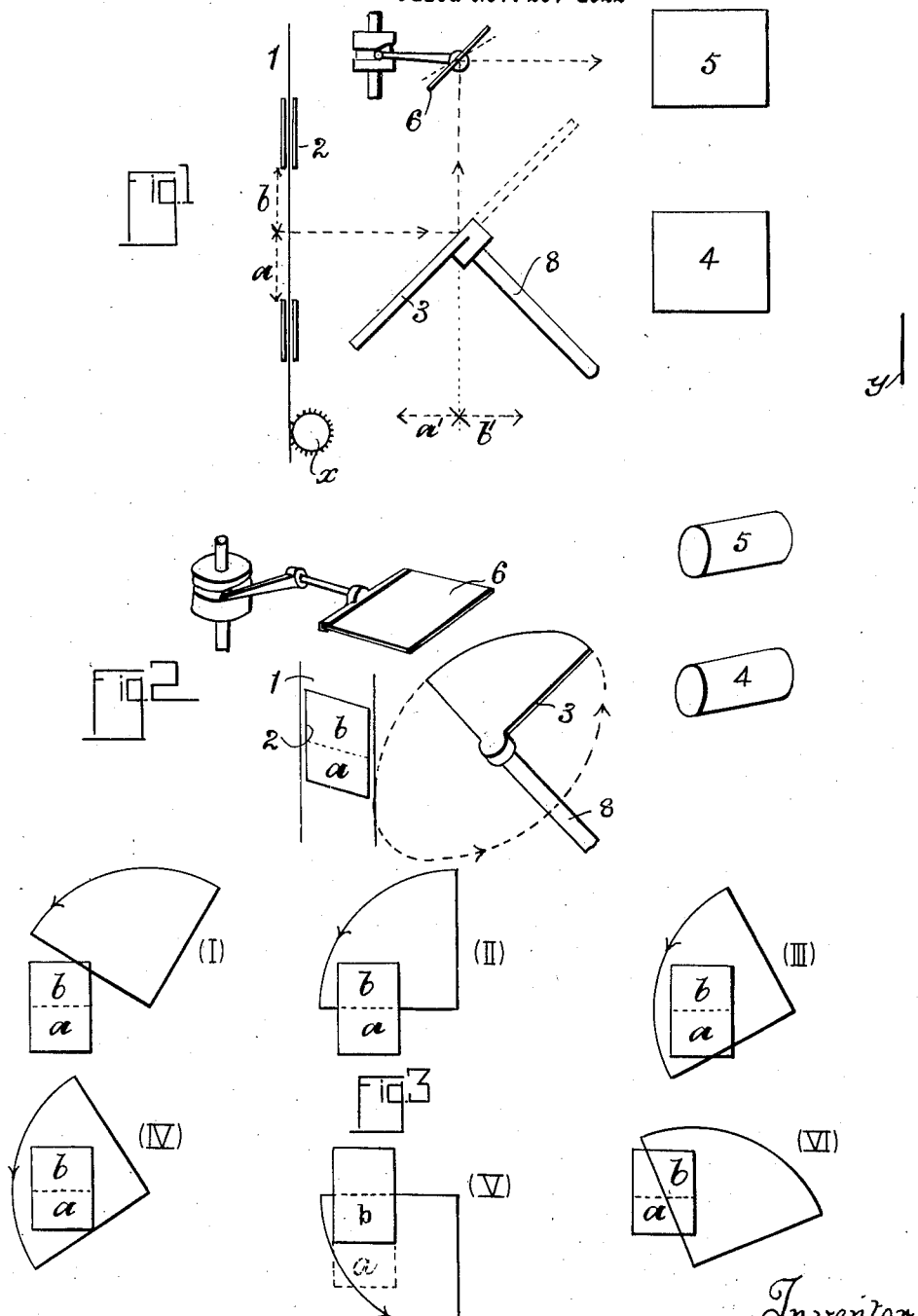

Patented Oct. 30, 1928.

1,689,266

UNITED STATES PATENT OFFICE.

HARRY WATSON, OF YORKSHIRE, ENGLAND.

PROJECTION APPARATUS AND METHOD.

Application filed November 20, 1922, Serial No. 602,047, and in Great Britain December 21, 1921.

This invention relates to kinematograph and like apparatus for showing a succession of pictures in such a way as to give the appearance of a single picture showing moving objects. In apparatus of the above type as at present in common use, a length of film bearing the required succession of pictures is moved intermittently so as to bring the pictures successively to the display position, where they are momentarily held stationary. The pictures are projected only whilst the film is stationary, movement of the film being hidden by the use of a rotating shutter which prevents projection during said movement. The use of such shutter causes the screen to be illuminated intermittently and this causes to the observer an objectionable eye-strain or a sense of flicker. There are also other objections such as, for example, the reduction in the average illumination of the screen. To overcome the above objections varied arrangement involving the use of moving prisms and lenses have been proposed, and it has also been proposed to use a rotating and oscillating mirror in combination, the action of such arrangements being such that a stationary picture is shown whilst the film is moving as well as when the film is stationary, so the screen is illuminated the whole, or substantially the whole, of the time the film is being exhibited. This invention relates to arrangements of this type, and has for its object to cause successive pictures to overlap one another on the screen. That is to say that whilst one picture is being exhibited, the next picture which is to succeed it is thrown upon the screen in superposition upon the picture which is already there, the first picture being then withdrawn. The pictures are thereby caused to merge into one another with what is sometimes known as a dissolving view effect. It will be seen from the description hereinafter given of the preferred form of the invention that each picture is shown for a greater time than would be possible if the pictures merely followed one another in succession without interval, that is to say that if, for example, the pictures are being shown at the rate of sixteen per second, each picture is shown for a period exceeding one-sixteenth of a second. This result is due to the particular way in which the movements of the co-operating parts are timed, as will be seen from the following description.

In order that the invention may be clearly understood, I will now describe the preferred form of same with reference to the accompanying drawings, which show diagrammatically only those parts of the apparatus necessary to illustrate the present invention.

Fig. 1 is a side view showing the arrangement of the parts.

Fig. 2 is a perspective view showing the same arrangement as in Fig. 1 on a slightly different scale.

Fig. 3 is a series of diagrams to elucidate the action of the apparatus.

Referring to Figs. 1 and 2, the film 1 is moved through a wheel $x$ in intermittent manner by a Maltese cross, "dog", or other mechanism in the usual way. The aperture in the gate 2 is enlarged to accommodate two pictures $a$, $b$ instead of the usual single picture, and two adjacent film pictures register with or are framed in the gate aperture when the film is stationary. A mirror 3, adapted to act as a shutter between the film 1 and the chief objective 4, is carried by a rotating shaft 8 so inclined that the mirror (which moves in its own plane) reflects horizontal rays of light from the film into a vertical direction as clearly seen in Fig. 1. Preferably the shaft is placed to one side so that the centre about which the mirror rotates is approximately level with the dividing line between the stationary pictures $a$, $b$ and laterally displaced with reference to the axis of the objective. Within limits, however, the centre of rotation may be otherwise disposed as will be better understood from the subsequent description with reference to Fig. 3. Above the objective 4 is a second objective 5. A mirror 6 mounted to oscillate about a horizontal axis under the control of a cam 7 or other suitable mechanism, is adapted to reflect light coming from the mirror 3, so as to direct it through objective 5. The axis of oscillation is preferably vertically above the center of rotation of the mirror 3, and level with the axis of the objective 5, as will be seen from Figure 1. The mirror 3 rotates at uniform speed, making one rotation in each period, the term period in this specification being understood to mean the time interval between the instant at which the film becomes stationary in the gate, and the next succeeding instant at which it again becomes stationary after movement of the film. The mirror 6 makes one to and fro oscillation within each period but at a non-uniform speed determined by the non-uniform film movement.

The action of the apparatus is as follows. Commencing at the beginning of a period as already defined, the stationary lower picture $a$ is exhibited directly through the objective 4 the picture $b$ being prevented from showing by a mask $y$, placed for example between the objective 4 and the screen. It will be understood that at this time the mirror 3 in the course of its rotation is so situated as not to be interposed between the gate aperture and the objective. When the picture $a$ has been exhibited in the above manner for a time which may be approximately, say, three-quarters of a period, the mirror 3 interposes between the gate and objective, as indicated in Fig. 3 at (I), (II), (III), (IV), and (V) which show different positions successively occupied by the mirror during its rotation. The first action of the mirror is gradually to reflect the upper picture $b$ on to the mirror 6 from which it is superposed through the objective 5, upon the picture $a$ which is being shown through objective 4. At (I) Fig. 3, the upper right-hand portion of picture $b$ has been so superimposed. At (II) the superposition is complete, picture $b$ being superposed, after reflection from the two mirrors, on picture $a$ which is being shown directly below the lower or leading edge of mirror 3. Further rotation of mirror 3 results in picture $a$ being cut off from objective 4 and from the screen. At (III), all but the lower right-hand portion has been so cut off. At (IV) the cut-off is complete, and picture $b$ is alone on the screen. During the period in which the mirror 3 was being interposed in the way above described, mirror 6 was being held stationary in the required position by its operating cam 7. As soon as the cut-off is complete as indicated at (IV), the change or movement of the film is timed to commence. This results in picture $b$ being moved downwards in the gate to the position formerly occupied by picture $a$. During this movement of the film the virtual image of picture $b$ in the mirror 3 moves from $b^1$ to $a^1$, and the mirror 6 is oscillated by its cam 7 so as to follow the virtual image, and maintain the image of picture $b$ stationary upon the screen. When this movement is completed picture $b$ and mirror 3 occupy a position as shown approximately at (V). At this time picture $b$ is being shown after two reflections through objective 5, but is prevented from being shown directly through the lower objective by the interposition of mirror 3. Continued rotation of the mirror, however, results in picture $b$ being shown directly through the lower objective, and at the same time results in mirror 6 and objective 5 ceasing to function. The period is now complete and the process is repeated in the same way with succeeding pictures. During the portion of the period in which the film is stationary and prior to the interposition of mirror 3 the mirror 6 is returned by cam 7 to its original position with as smooth a motion as practicable, ready to repeat the action already described. It will be seen that the arrangement above described gives the change from one picture to the next with a dissolving view effect. The exact effect obtained depends upon the position of the centre of rotation of mirror 3, which, as has already been stated, may be varied within limits. In Fig. 3, one such alternative position is shown at (VI), where the centre of rotation is directly below the right-hand edge of pictures $a$, $b$. It will be seen that the interposition of the mirror results in approximately corresponding portions of pictures $a$, $b$ being simultaneously and respectively cut off from direct exhibition, and exhibited through the upper objective, the complete superposition on the screen of one picture over the other not being attained, for which reason the centre of rotation is to be placed approximately as shown at (I) to (V). From what has been said it will be realized that the cam 7 or equivalent means for operating the oscillating mirror must be designed to hold the mirror 6 stationary during the interposition of the mirror 3, to cause the mirror 6 to move in one direction during the change movement of the film, to hold the mirror 6 stationary whilst the mirror 3 is uncovering the lower picture to allow its direct projection through the lower objective, and to return the mirror to its original position. With reference to the shaft 5, the cam 7, and the cam of the Maltese cross movement which is not shown in the drawings, each makes one revolution per period. The movements of the various parts must be correctly timed to secure their cooperation in the required manner. In practice it is frequently necessary to adjust the position of the film during the running of the apparatus to secure a proper registration or framing of the picture in the gate aperture. When this is done by an angular adjustment of the Maltese cross mechanism, means must be provided whereby corresponding adjustments of the cam 7 and mirror 3 are effected simultaneously, so as to maintain the necessary timing of the movements. This may be effected by adaptation of a known type of arrangement in which a rotary adjustment is given to one member mounted on a shaft by a longitudinal adjustment of a second member mounted on the shaft, by means of a pin or projection on one member engaging a helical slot or groove of rapid pitch in the other member. I prefer, however, to avoid the additional mechanism for such timing adjustment by using a known type of framing arrangement (sometimes called a "fixed optical" system) in which the gate member and the objective are fixtures, and the cross mechanism is bodily adjustable along a vertical non-circular support. The film is thus vertically adjustable in the gate, this movement of adjustment being independent of and additional to the intermittent movement given to the film by the cross mechanism. With this arrangement there is no angular adjustment, the timing of the various parts can be effected once for all when the apparatus is being assembled, and it remains unaffected by subsequent framing adjustments.

The invention is not confined to the particular arrangements described, as it will be obvious to those versed in the art that numerous variations in arrangement and design of apparatus are possible within the scope of the following claims:

1. In an apparatus of the class described, a gate member exposing two stationary pictures of a picture strip, an objective in front of one of said pictures, a mirror moving in an angular plane to said pictures and between the latter and said objective, a second objective laterally spaced from the first objective, a second mirror disposed to reflect light from the first mirror through said second objective, said first mirror in its movement reflecting the other of said pictures to the second mirror and through the second objective whereby the projection of said other picture is imposed upon that of the first named picture.

2. In an apparatus of the class described, a gate member exposing two stationary pictures of a picture strip, an objective in front of one of said pictures, a mirror moving in an angular plane to said pictures and between the latter and said objective, a second objective laterally spaced from the first objective, a second mirror disposed to reflect light from the first mirror through said second objective, said first mirror in its movement reflecting the other of said pictures to the second mirror and through the second objective whereby the projection of said other picture is imposed upon that of the first named picture, said mirror in its continued movement cutting out the first named picture.

3. In an apparatus of the class described, an intermittently advanced film, a gate member exposing two adjacent film pictures, an objective in front of one of said pictures, a mirror moving in an angular plane to said pictures and between the latter and said objective, a second objective laterally spaced from the first objective, a second mirror disposed to reflect light from the first mirror through the second objective, said first mirror in its movement reflecting the other of said pictures through said second mirror and through said second objective, whereby the projection of said other picture is imposed upon that of the first named picture, said mirror in its continued movement cutting out the first named picture prior to the advance of the film.

4. In an apparatus of the class described, an intermittently advanced film, a gate member exposing two adjacent film pictures, an objective in front of one of said pictures and between the latter and said objective, a second objective laterally spaced from the first objective, a second mirror disposed to reflect light from the first mirror through the second objective, said first mirror in its movement reflecting the other of said pictures through said second mirror and through said second objective, whereby the projection of said other picture is imposed upon that of the first named picture, said mirror in its continued movement cutting out the first named picture prior to the advance of the film, and means for compensating the film movement upon its advance whereby the displacement of the projection of said other picture is prevented.

5. In an apparatus of the class described, an intermittently advanced film, a gate member exposing two adjacent film pictures, an objective in front of one of said pictures, a mirror moving in an angular plane to said pictures and between the latter and said objective, a second objective laterally spaced from the first objective, a second mirror disposed to reflect light from the first mirror through the second objective, said first mirror in its movement reflecting the other of said pictures through said second mirror and through said second objective, whereby the projection of said other picture is imposed upon that of the first named picture, said mirror in its continued movement cutting out the first named picture prior to the advance of the film, and means for rocking said second mirror upon the advance of the film whereby the displacement of the projection of said other picture is prevented.

6. In an apparatus of the class described, a gate member exposing two stationary adjacent pictures of a picture strip, an objective in front of one of said pictures, a segmental mirror rotating about its axis in an angular plane to said pictures and between the latter and said objective, a second objective laterally spaced from the first objective, a second mirror disposed to reflect light from the first mirror through the second objective, said first mirror in its rotation reflecting the other of said pictures to said second mirror and through said second objective, whereby the projection of said other picture is imposed upon that of the first named picture.

7. In an apparatus of the class described, a gate member exposing two stationary adjacent pictures of a picture strip, an objective in front of one of said pictures, a segmental mirror rotating about its axis in an angular plane to said pictures and between the latter and said objective, a second objective laterally spaced from the first objective, a second mirror disposed to reflect light from the first mirror through the second objective, said first mirror in its rotation reflecting the other of said pictures to said second mirror and through said second objective, whereby the projection of said other picture is imposed upon that of the first named picture.

8. In an apparatus of the class described, an intermittently advanced film, a gate member exposing two adjacent film pictures, an objective in front of one of said pictures, a segmental mirror rotating about its axis in an angular plane to said pictures and between the latter and said objective, a second objective laterally spaced from the first objective, a second mirror disposed to reflect light from the first mirror through the second objective, said first mirror in its rotation reflecting the other of said pictures to said second mirror and through said second objective, whereby the projection of said other picture is imposed upon that of the first named picture, prior to the advance of the film.

9. In an apparatus of the class described, an intermittently advanced film, a gate member exposing two adjacent film pictures, an objective in front of one of said pictures, a segmental mirror rotating about its axis in an angular plane to said pictures and between the latter and said objective, a second objective laterally spaced from the first objective, a second mirror disposed to reflect light from the first mirror through the second objective, said first mirror in its rotation reflecting the other of said picture to said second mirror and through said second objective, whereby the projection of said other picture is imposed upon that of the first named picture, and means for compensating the film movement upon its advance, whereby displacement of the projection of said other picture is prevented.

10. In an apparatus of the class described, an intermittently advanced film, a gate member exposing two adjacent film pictures, an objective in front of one of said pictures, a segmental mirror rotating about its axis in an angular plane to said pictures and between the latter and said objective, a second objective laterally spaced from the first objective, a second mirror disposed to reflect light from the first mirror through the second objective, said first mirror in its rotation reflecting the other of said pictures to said second mirror and through said second objective, whereby the projection of said other picture is imposed upon that of the first named picture prior to the advance of the film, and means for rocking said second mirror upon the advance of the film, whereby the displacement of the projection of said other picture is prevented.

11. An apparatus according to claim 10 wherein the axial point of said rotating segmental mirror lies to one side of said strip in a plane substantially perpendicular to the plane of the exposed pictures and passing between said pictures.

12. In an intermittent-feed projection apparatus, a gate member exposing two stationary adjacent picture areas of a picture strip, means for projecting the first picture area alone, means for projecting the second picture area and imposing its projection upon that of the first and then cutting out the first, and means to advance the strip, said means for projecting the second picture area including means for optically compensating for the movement of said strip.

13. In an intermittent-feed projection apparatus, a gate member exposing two stationary adjacent picture areas of a picture strip, means for projecting the first picture area alone, means for progressively projecting the second picture area and imposing its projection upon that of the first and then cutting out the first, and means to advance the strip, said means for projecting the second picture area including means for optically compensating for the movement of said strip.

14. In an intermittent-feed projection apparatus, a gate member exposing two stationary adjacent picture areas of a picture strip, means for projecting the first picture area alone, means for projecting the second picture area and imposing its projection upon that of the first, and means to advance the strip, said means for projecting the second picture area including shutter means to cut out the first picture after the completion of such imposition and means for optically compensating for the movement of said strip.

15. In an intermittent-feed projection apparatus, a gate member exposing two stationary adjacent picture areas of a picture strip, means for projecting the first picture area alone, means for projecting the second picture area and imposing its projection upon that of the first, and means to advance the strip, said means for projecting the second picture area including reflecting means so arranged as to cut out the first picture after the completion of said imposition and means for optically compensating for the movement of the strip.

16. In an intermittent-feed projection apparatus, a gate member exposing two stationary adjacent picture areas of a picture strip, means for projecting the first picture area alone, means for progressively projecting the second picture area and imposing its projection upon that of the first, and means to advance the strip, said means for projecting the second picture area including reflecting means so arranged as to cut out the first picture after the completion of said imposition and means for optically compensating for the movement of the strip.

17. The method of projecting consecutive picture areas of an intermittently fed picture strip through a double-height gate, said method consisting in singly projecting the first picture area on a screen, projecting the second picture area and superimposing its projection on that of the first, obliterating the first, advancing the strip to bring the second picture area into the position formerly occupied by the first, and maintaining the image of said second picture area stationary on the screen during such advance.

18. The method of projecting consecutive picture areas of an intermittently fed picture strip through a double-height gate, said method consisting in singly projecting the first picture area on a screen, progressively projecting the second picture area and superimposing its projection on that of the first, obliterating the first upon the completion of such superimposition, advancing the strip to bring the second picture area into the position formerly occupied by the first, and maintaining the image of said second picture area stationary on the screen during such advance.

HARRY WATSON.